(12) United States Patent  (10) Patent No.: US 7,403,521 B2
Saxena  (45) Date of Patent: Jul. 22, 2008

(54) MULTICAST AND BROADCAST OPERATIONS IN ETHERNET SWITCHES

(75) Inventor: Rahul Saxena, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 828 days.

(21) Appl. No.: 10/004,765

(22) Filed: Dec. 3, 2001

(65) Prior Publication Data

US 2003/0103517 A1 Jun. 5, 2003

(51) Int. Cl.
*H04L 12/28* (2006.01)

(52) U.S. Cl. .................. 370/390; 370/412; 370/432

(58) Field of Classification Search ............. 370/230, 370/389–390, 392, 400, 412–414, 419–421, 370/422–423, 428–429, 431–432
See application file for complete search history.

(56) References Cited

U.S. PATENT DOCUMENTS

| 5,410,540 | A | * | 4/1995 | Aiki et al. ................... 370/390 |
| 5,548,588 | A | * | 8/1996 | Ganmukhi et al. ........ 370/395.7 |
| 5,646,886 | A | * | 7/1997 | Brahmbhatt ............ 365/185.16 |
| 5,915,097 | A |   | 6/1999 | Chao ..................... 395/200.68 |
| 6,272,567 | B1 | * | 8/2001 | Pal et al. ....................... 710/56 |
| 6,574,194 | B1 | * | 6/2003 | Sun et al. ..................... 370/235 |
| 6,724,761 | B1 | * | 4/2004 | Moy-Yee et al. ............ 370/390 |
| 6,751,219 | B1 | * | 6/2004 | Lipp et al. .................. 370/390 |
| 2005/0041579 | A1 | * | 2/2005 | Medina et al. .............. 370/229 |

* cited by examiner

*Primary Examiner*—Huy D. Vu
*Assistant Examiner*—Jason Mattis
(74) *Attorney, Agent, or Firm*—Kacvinsky LLC

(57) ABSTRACT

A switch and a process of operating a switch are described where a received data frame is copied one or more times into a memory before being transmitted out of the switch. The switch and method determine how much space in the memory is needed to store all of the copies of the received data frame and then the switch and method determine locations in the memory for storing the copies of the received data frames. The copies of the received data frame are stored until the ports designated as transmitting the copies of the received data frame are ready. When a port is ready, a copy of the received data frame is read out of the memory and the port is instructed where to locate the copy on a bus. When the port has retrieved the copy of the data frame, it transmits the data frame out of the switch.

25 Claims, 10 Drawing Sheets

MULTICAST AND BROADCAST OPERATIONS IN ETHERNET SWITCHES

TECHNICAL FIELD

This invention relates to forwarding data frames through a switch, and more particularly to routing data frames for efficient multicast and broadcast operations in Ethernet switches.

BACKGROUND

Some switches, such as Ethernet switches, receive data frames at one or more ports. A data frame is an organized format of control or header data and payload data. The header data typically include fields such as the source address of the device transmitting the data frame, the destination address or addresses to which the data frame is being transmitted, length/type data indicating the length of the data frame as well as the data type of the payload data, and a frame check sequence field used as a form of error checking in verifying receipt of the data frame by the destination device. The control data are overhead that are used to assure that the payload data arrive at the destination device.

The payload data are the data of interest that are sent to the destination device. Examples of payload data include pixel data for image rendering, audio data, text data and control data (e.g., commands requesting that the destination device transmit information back to the original source device).

In some network implementations, data frames may have different sizes. For example, in a typical Ethernet network, frame size may vary from a minimum of 64 bytes to a maximum of 1,518 bytes. In general, forwarding received data frames from a switch includes one of three methods: unicast, multicast and broadcast. A unicast transmission employs a one-to-one correspondence between the source device and the destination device such that the data frame output by a source device will only be received and used by a single destination device. A multicast transmission employs a one-to-many correspondence such that a single source device transmits a data frame for receipt and use by multiple destination devices. A broadcast transmission employs a one-to-all correspondence such that a single source device transmits a data frame to all destination devices on a particular network to which the source device is connected.

A switch receives data frames and forwards them to output ports for retransmission to other switches or destination devices. In some switches, a memory is employed to temporarily store a received data frame until the needed port becomes free to output that data frame. These types of switches may be referred to as store-and-forward (SAF) switches.

Memory bandwidth usage can be inefficient as some of the memory bandwidth is not used when storing smaller data frames. To compensate for this, a memory is divided into independently addressable channels. This allows for smaller data frames to be stored in particular channels, which results in more efficient use of memory and increased throughput. That is, different channels may be accessed independently for reading or writing data frames. By dividing a large memory into channels, the overall speed, or useful bandwidth (data frame width multiplied by the memory access frequency), of a switch increases. By increasing the useful bandwidth of the internal hardware, additional ports may be supported without unnecessarily increasing the size of the memory.

When using an SAF switch to multicast or broadcast data frames over the network, a particular data frame may be read from memory multiple times, such as once for each port that is to retransmit the data frame. Since only one of the multiple channels is accessed at a time, the useful bandwidth of an SAF switch decreases when multicasting or broadcasting data frames.

DESCRIPTION OF DRAWINGS

FIG. 4b is a block diagram of a cell of the memory circuit of FIG. 4a.

DETAILED DESCRIPTION

Figure 1:
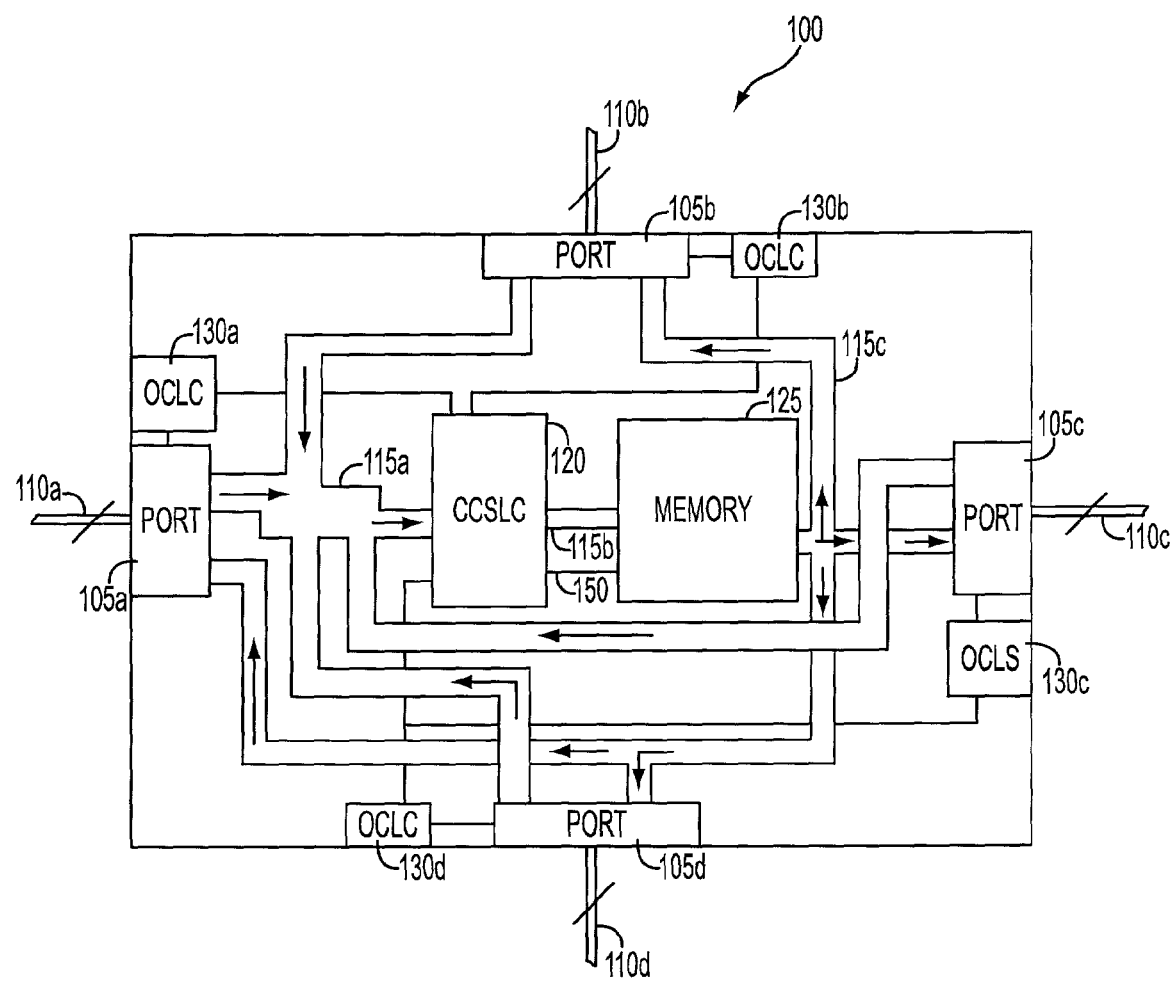
FIG. 1 is a block diagram of a switch.

As shown in FIG. 1, a switch 100 has four ports 105a-105d. Ports 105a-105d are circuits may include hardware, software, firmware or any combination thereof. The ports 105a-105d are coupled to four buses 110a-110d respectively, and are used to transmit data from and receive data into switch 100. Ports 105a-105d and buses 110a-110d are full duplex in that they can transmit and receive data simultaneously. In one implementation, switch 100 is an Ethernet switch.

A receiving bus 115a and a transmitting bus 115c are coupled to ports 105a-105d. Receiving bus 115a forwards received data frames from ports 105a-105d to a copier, channel select logic circuit (CCSLC) 120. An intermediate bus 115b forwards received data frames from CCSLC 120 to main memory 125, and a bus 150 forwards address data to main memory 125 for use in storing the received data frames. The transmitting bus 115c forwards data frames stored in main memory 125 to ports 105a-105d. Interspersed in switch 100 are four output control logic circuits (OCLCs) 130a-130d that are associated with ports 105a-105d, respectively. CCSLC 120 is coupled to the four OCLCs 130a-130d and main memory 125 through control signal paths. It should be noted that a logic circuit may include gates, hardware, software, firmware or any combination thereof.

Memory 125 includes channels and segments. A channel is a portion of the total width of a memory unit. A segment is an individually addressable collection of channels (e.g., a segment may include four channels). A location is a part of memory that is addressable by both a channel address and a segment address.

In general, the switch 100 receives data frames on buses 110a-110d at ports 105a-105d. The received data frames then are forwarded to CCSLC 120 using receiving bus 115a. CCSLC 120 determines how many copies of the received data frame are needed for broadcast or multicast operations, copies the received data frame, and determines particular locations in main memory 125 for storing the copies of the received data frame. OCLCs 130a-130d determine when to output the stored copies of the data frame over buses 110a-110d through ports 105a-105d based upon control data received from CCSLC 120.

Figure 2:
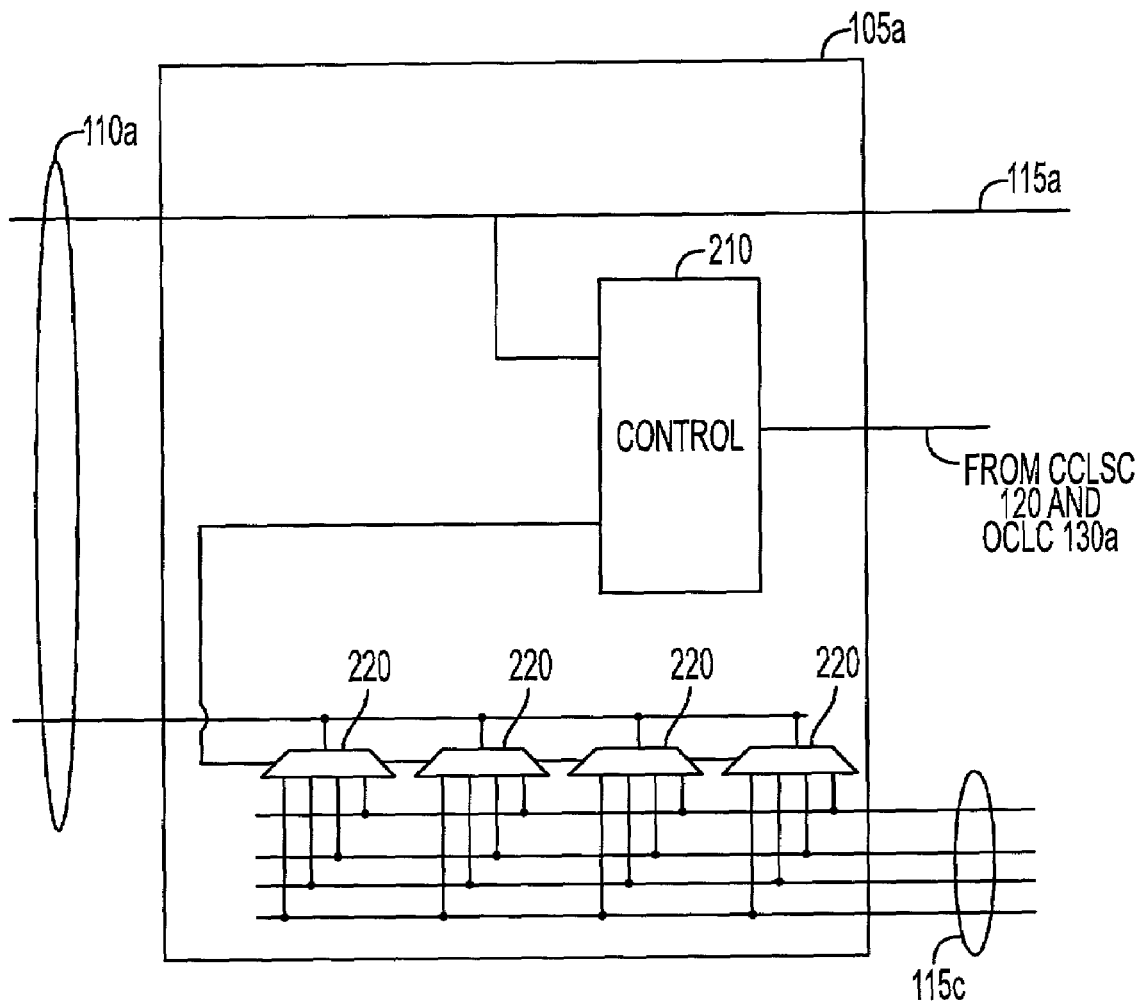
FIG. 2 is a block diagram of a port of the switch of FIG. 1.

As shown in FIG. 2, exemplary port 105a contains control circuit 210 and multiplexers 220. Exemplary port 105a receives a data frame on transmitting bus 115c for forwarding. The data frame received on transmitting bus 115c is extracted from transmitting bus 115c by multiplexers 220. Control circuit 215 exchanges control signals with CCSLC 120 and OCLCs 130a-130d.

Figure 3:
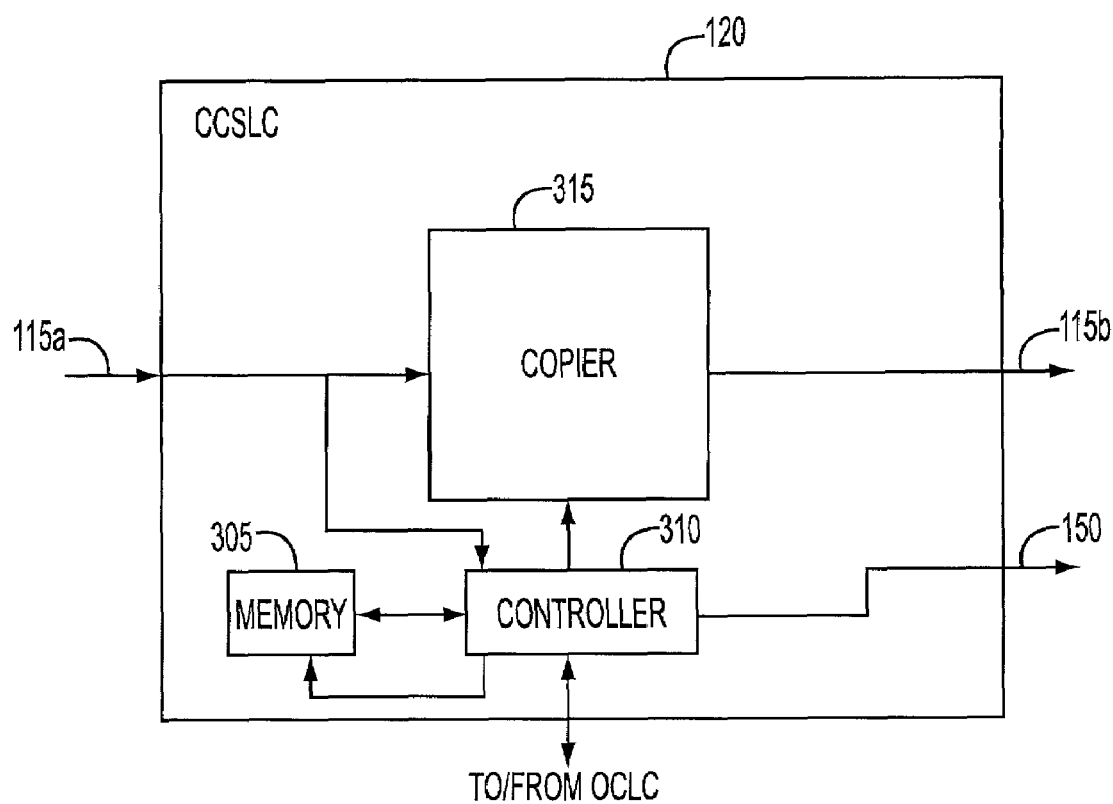
FIG. 3 is a block diagram of a copier, channel select logic circuit of the switch of FIG. 1.

As shown in FIG. 3, CCSLC 120 includes memory 305 coupled to a controller 310. The controller 310 is coupled to a copier circuit 315 that receives incoming data frames on receiving bus 115a and outputs a number of copies of the incoming data frames onto intermediate bus 115b. The incoming data frames on receiving bus 115a contain header data and payload data. The output data frames on intermediate bus 115b are exact copies of the data frames received on receiving bus 115a and, accordingly, also include header data and payload data.

As described earlier, exemplary header data may include at least the destination address of the data frame and the length of the data frame. Controller 310 uses the destination address and length data fields to determine how many copies of the received data frame are required and where in main memory 125 to store those copied data frames. The controller 310 forwards addresses on address bus 150 to identify locations in main memory 125 to be used. In addition, the controller 310 generates control signals that are sent to OCLCs 130a-130d and used to determine which data frames to read out from main memory 125 and at what time to transmit those data frames.

Memory 305 is used to track locations in main memory 125 that are available to accept copies of received data frames. Memory 305 can be any suitable digital storage device. In one implementation, memory 305 is a volatile memory that can be accessed quickly for both reading and writing. The size of memory 305 correlates with the size of main memory 125.

Figure 4A:
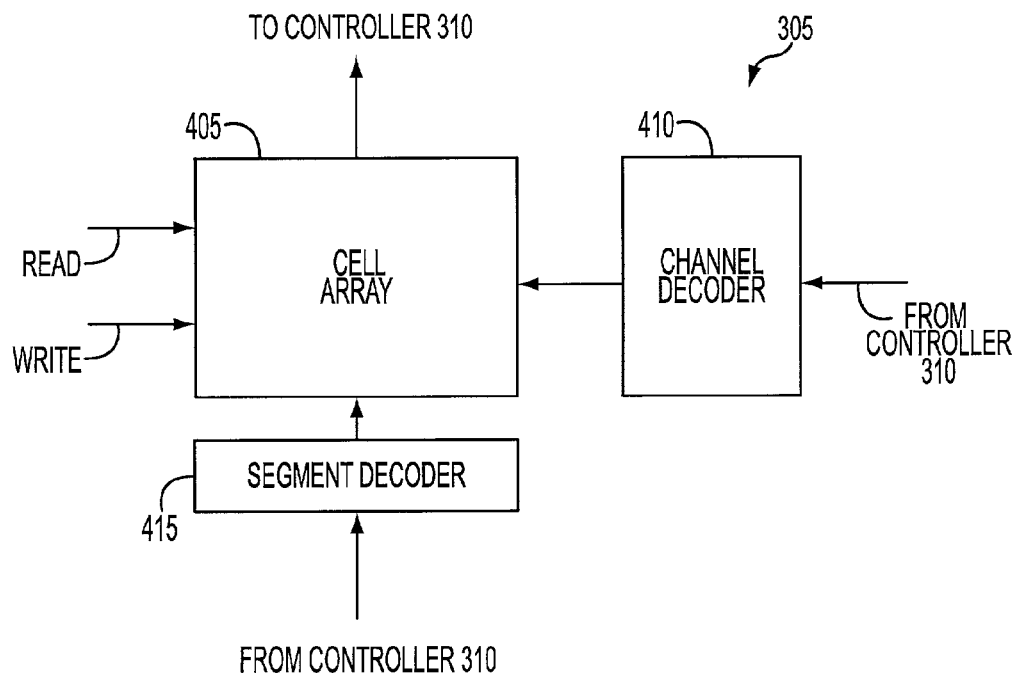
FIG. 4a is a block diagram of a memory circuit in the copier, channel select logic circuit of FIG. 3.

As shown in FIG. 4a, an exemplary memory 305 may include an array of memory cells 405, a channel decoder 410 and a segment decoder 415. In one implementation, array 405 is four bits wide and sixteen bits long. This correlates to main memory 125, which has four channels and sixteen segments.

Each cell in array 405 holds a single bit and correlates to a particular channel in a particular segment of main memory 125. If a particular cell in memory 305 currently stores a 1-bit, that is an indication that the corresponding channel of the corresponding segment of main memory 125 contains valid frame data and cannot presently accept a new data frame. Alternatively, if a particular location in memory 305 currently stores a 0-bit, that is an indication that the corresponding channel of the corresponding segment of main memory 125 contains invalid frame data, (i.e., it is empty) and can presently accept new data.

Each cell in array 405 is individually addressable through channel decoder 410 and segment decoder 415, which receive control signals from the controller 310. The cells also may be addressable by row or column in another implementation.

Figure 4B:
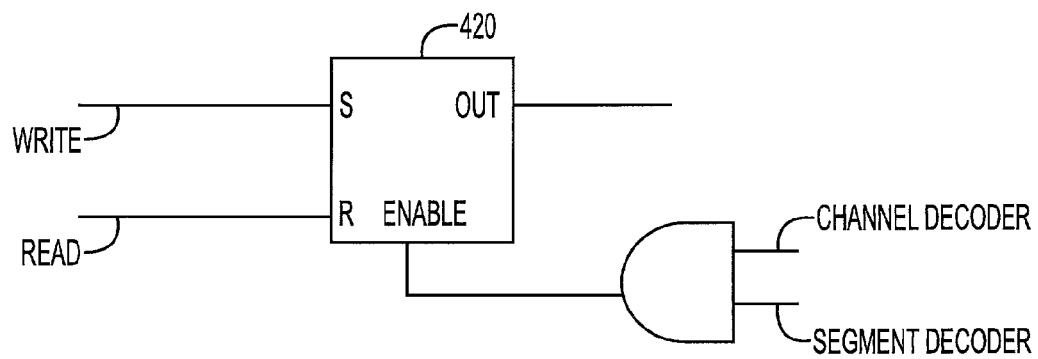

As shown in FIG. 4b, each cell 420 of array 405 may be implemented as an S-R flip flop that is enabled by a combination of the appropriate channel decoder and segment decoder signals. The set input of the flip-flop is connected to a write signal, and the reset input is connected to a read signal. Thus, the value of the cell is set to one when the write signal is asserted and the channel decoder and segment decoder signals indicate that data is being loaded into the corresponding portion of memory 125, and is set to zero when the read signal is asserted and the decoder signals indicate that data is being read from the corresponding portion of main memory 125. The cell 420 may be further configured to produce an output only when the enable signal is asserted so as to permit the controller to poll the memory 305 to detect cells having values indicative of available portions of main memory 125.

An exemplary main memory 125 may have four channels, each of which is 64 bytes wide, and sixteen segments. This means that main memory 125 can store 64, 64-byte data frames (one in each channel in each segment), sixteen, 256-byte data frames (one spanning all four channels in each segment), or other combinations.

Figure 5:
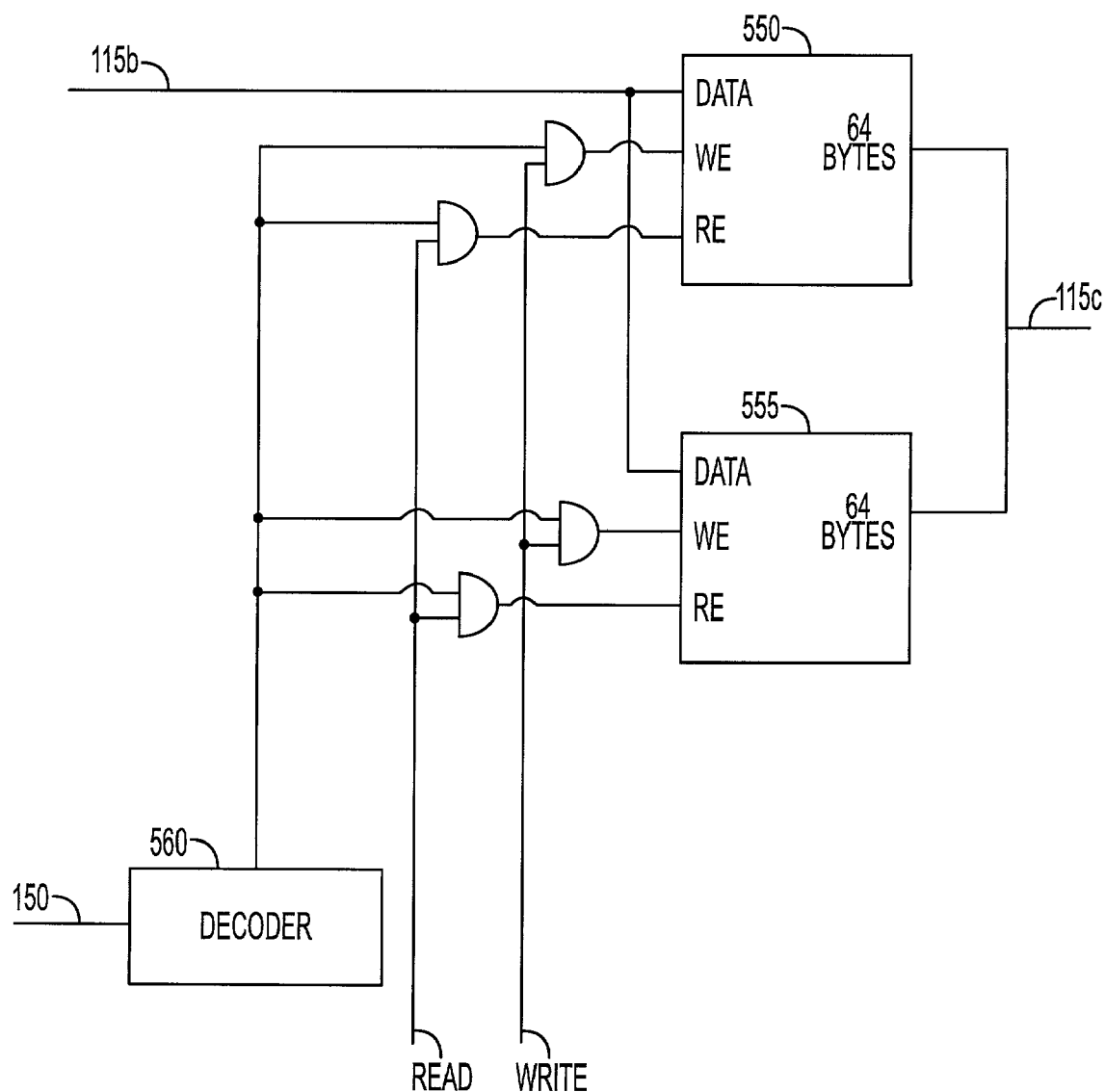
FIG. 5 is a block diagram of a main memory circuit of the switch of FIG. 1.

FIG. 5 shows a pair of exemplary cells 550, 555 in main memory 125 that each store 64 bytes. Each cell represents one location in main memory 125 (i.e., one channel of one segment). A decoder 560 uses the address bus 150 to generate signals that are combined with read and write signals to enable writing to and reading of a particular one of cells 550, 555. It should also be noted that any type of data randomly accessible, writeable storage device. Examples include RAM, SRAM, DRAM, RDRAM and SDRAM.

When a data frame is received, a determination is made as to which portion of main memory 125 is to store the received data frame. The received data frame then is copied onto bus 115b and the address bus 150 is used to identify one or more appropriate cells. The appropriate cells are activated by a combination of a signal from the decoder 560 and a write enable signal from the controller 310. Similarly, a stored data frame is forwarded onto bus 115c by signals on the address bus 150 identifying the appropriate cells. The cells are activated by a combination of a signal from the decoder 560 and a read enable signal from the controller 310.

Figure 6:
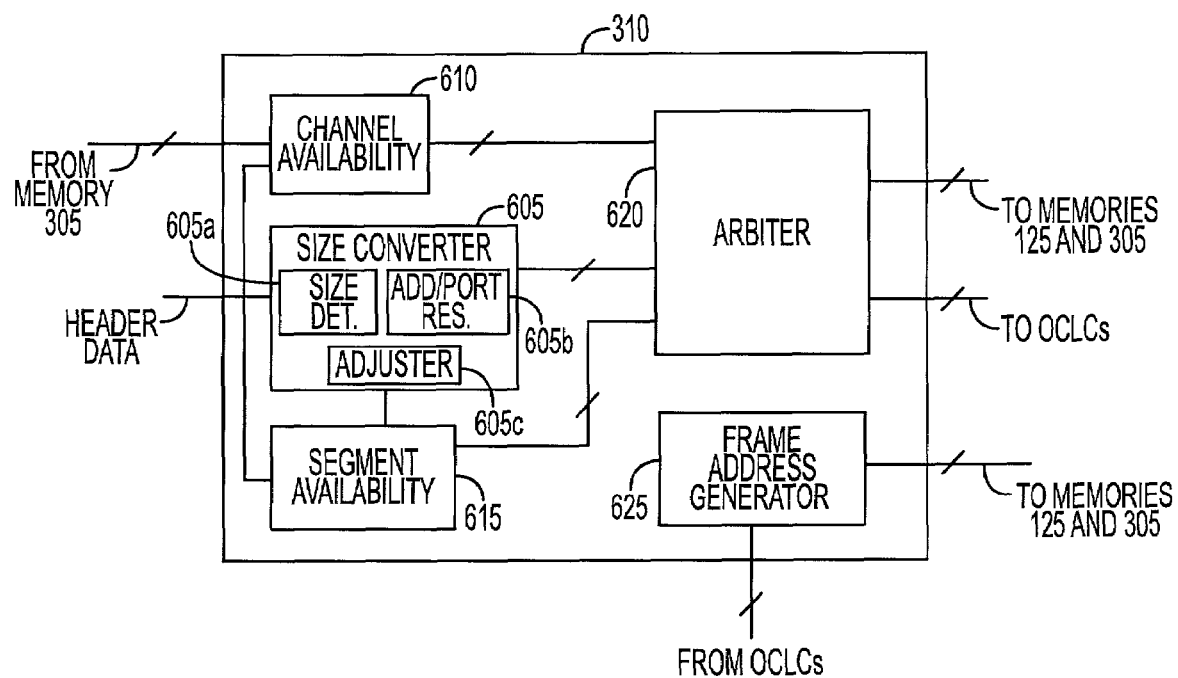
FIG. 6 is a block diagram of a controller circuit of the copier, channel select logic circuit of FIG. 3.

As shown in FIG. 6, an exemplary controller 310 includes a size converter circuit 605, a channel availability circuit 610, a segment availability circuit 615, an arbiter circuit 620, and a frame address generator 625. Size converter circuit 605 receives a portion of the header data from a data frame on receiving bus 115a. Size converter 605 includes a size determiner circuit 605a, an address/port resolver circuit 605b, and an adjuster circuit 605c. Channel availability circuit 610 receives all of the bits stored in memory 305 as inputs. In the exemplary circuit shown in FIG. 6, memory 305 outputs 64 bits. Segment availability circuit 615 receives output data from size converter circuit 605 and channel availability circuit 610. Arbiter circuit 620 receives output data from size converter circuit 605, channel availability circuit 610 and segment availability circuit 615. Frame address generator 625 receives signals from OCLCs 130a-130d and outputs signals to main memory 125 and memory 305.

Size converter circuit 605 receives the size data of the data frame being transmitted on receiving bus 115a. Size data are extracted from the header data for a frame.

Since main memory 125 is divided into discrete channels, a determination is needed as to how many channels are required to store one copy of the received data frame. Using a maximum data frame width of 256 bytes, a standard binary encoding technique requires an 8-bit word to indicate the size of the data frame. Size converter circuit 605 takes the 8-bit word for a particular frame and generates an output indicative of how many channels of a single segment in main memory 125 are required to store the frame. As an example, if the data frame on receiving bus 115a is 176 bytes wide, size converter circuit 605 generates an output signal indicating that this data frame requires three channels (each of which is 64 bytes wide) of the segment.

Address-port resolver circuit 605*b* receives at least the destination address(es) from the header, and uses this data to produce an output indicative of which ports 105*a*-105*d* are to transmit the received data frame. The output of the address-port resolver circuit 605*b* is used to control operation of other parts of switch 100 so as to produce the correct number of copies of the received data frame and routing of the copies of the received data frame to the proper port or ports.

Adjuster circuit 605*c*receives the output from size determiner circuit 605*a* and the output from address-port resolver circuit 605*b* and generates an output indicative of the number of segments needed to store the number of copies of the data frame. For example, if a 128-byte received data frame is to be broadcast through all four ports, such that four copies of the received data frame are to be stored in main memory 125, the adjusted 605*c* will indicate that the data frame is to be stored in at least two segments, with each copy being stored in two channels of a segment.

Channel availability circuit 610 receives the outputs from memory 305 and determines where there are vacant channels. This is accomplished using logic gates or the like to determine sets of zeroes in a segment of memory 305. That is, channel availability circuit 610 determines if there are any single zeroes, pairs of zeroes, triples of zeroes or quads of zeroes. The results are output to segment availability circuit 615 and arbitrator circuit 620. Depending on the design of channel availability circuit 610, it may only register availability if contiguous channels in a segment are vacant or it may register availability if the proper number of channels is available regardless of contiguousness.

Arbitrator 620 selects the channel(s) and segment(s) to receive the copies of the input data frame. Typically, main memory 125 will have multiple locations that are available to receive the copies of the input data frame. As an example, if switch 100 receives a 64-byte data frame for which only one copy is needed, and main memory 125 is empty, there are 64 locations that can accept this data frame. Arbitrator 620 selects one location from the available pool of 64 locations.

Each OCLC stores data that are in turn used to determine when each port is to receive and output a stored data frame. In one implementation, each OCLC receives a code word that translates to one or more locations in main memory 125. This code word is stored in a queue. As the data are output from main memory 125 to the port associated with the OCLC, the code words stored in the queue are advanced. When a particular code word in the OCLC reaches the head of the queue, it is forwarded to frame address generator circuit 625.

In the implementation shown having four ports, it is possible that two or more OCLCs will request data from the same channel or segment at one time. To avoid this collision of data from main memory 125, the frame address generator circuit 625 arbitrates between the received code words.

Figure 7:
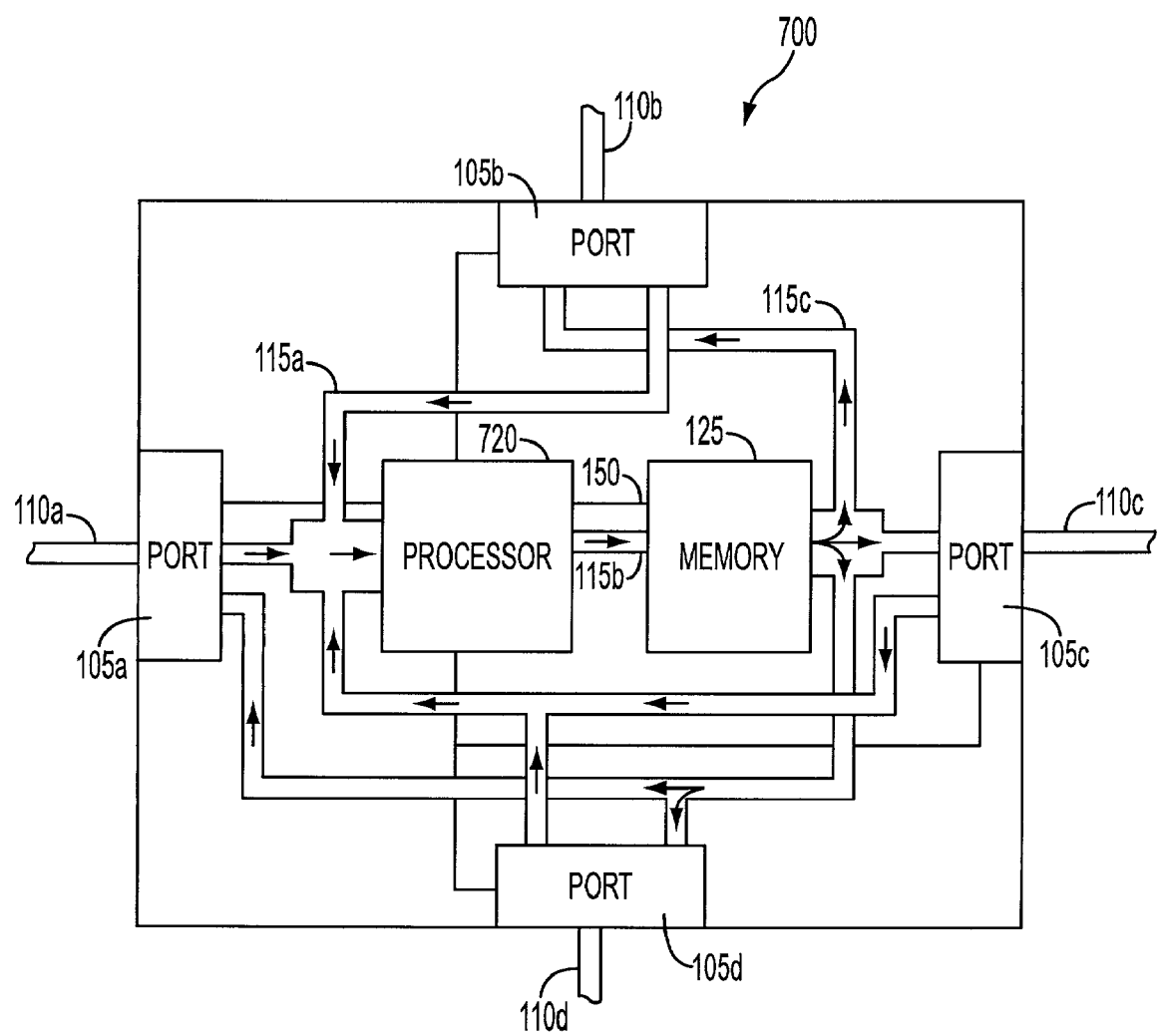
FIG. 7 is a block diagram of another switch.

FIG. 7 shows an alternative switch 700 that includes a general processor 720. Like exemplary switch 100, switch 700 includes four ports 105*a*-105*d* that are coupled with four external buses 110*a*-110*d* and internal buses 115*a*-115*c*. Processor 720 is coupled with internal bus 115*a* and intermediate bus 115*b*. Memory 125 is coupled with internal buses 115*b* 115*c*.

The function and operation of most of the elements of exemplary switch 700 have been previously described and will not be repeated. One difference between exemplary switches 100 and 700 is the use of a general purpose processor to perform the copying, the determining of acceptable memory locations to store the copies, and the outputting of data frames from memory 125 to ports 105*a*-105*d* for transmission over buses 110*a*-110*d*. Processor 720 contains memory such as ROM or RAM (not shown) that holds the instructions used to control the operation of processor 720 and therefore the operation of switch 700.

Figure 8:
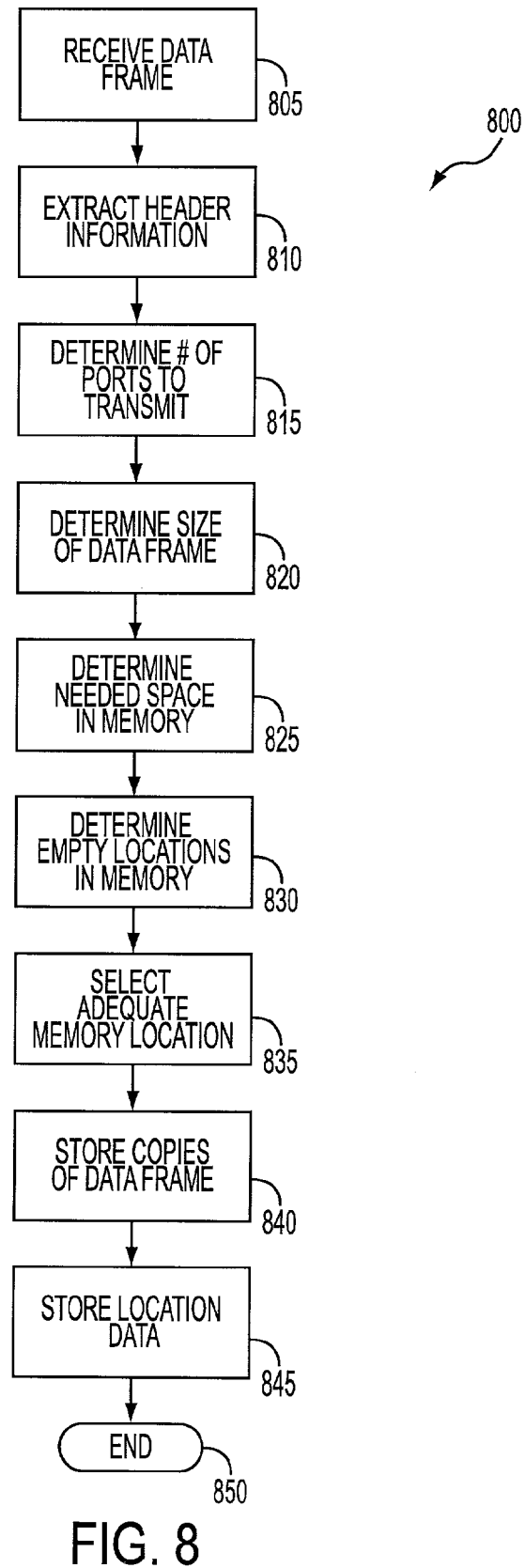
FIG. 8 is a flow chart of a process for storing copies of a received data frame for the switches shown in FIGS. 1 and 7.

FIG. 8 shows an exemplary process 800 for copying data frames into a memory. This process is initiated when the switch receives a data frame (step 805). The header information, which contains at least destination information and frame size, is extracted from the data frame (step 810). From the destination information, the number of ports that are to output the data frame is determined (step 815) along with the size of the received data frame (step 820). From the number of ports to output the data frame and the size of the received data frame, the minimum amount of memory necessary to store the copies of the data frame, with one copy for each port that is to output the data frame, is determined (step 825).

Next, the empty locations in memory are determined (step 830). In one implementation, the determination is made by storing 1-bits and 0-bits in a separate memory, with the 1-bits and 0-bits corresponding to full and empty locations, respectively, in the data frame memory, and polling this separate memory to locate an adequate concentration of 0-bits empty locations to store the copies of the received data frame. Once all of the suitable locations in frame memory have been identified, one or more locations are selected to store the copies of the data frame (step 835). The copies of the data frame are then stored in the selected memory locations of the frame memory (step 840). Each copy of the data frame is associated with a port that will transmit that copy of the data frame and this association is stored along with the locations in frame memory of the copies of the data frame(step 845). The process then ends (step 845).

Figure 9:
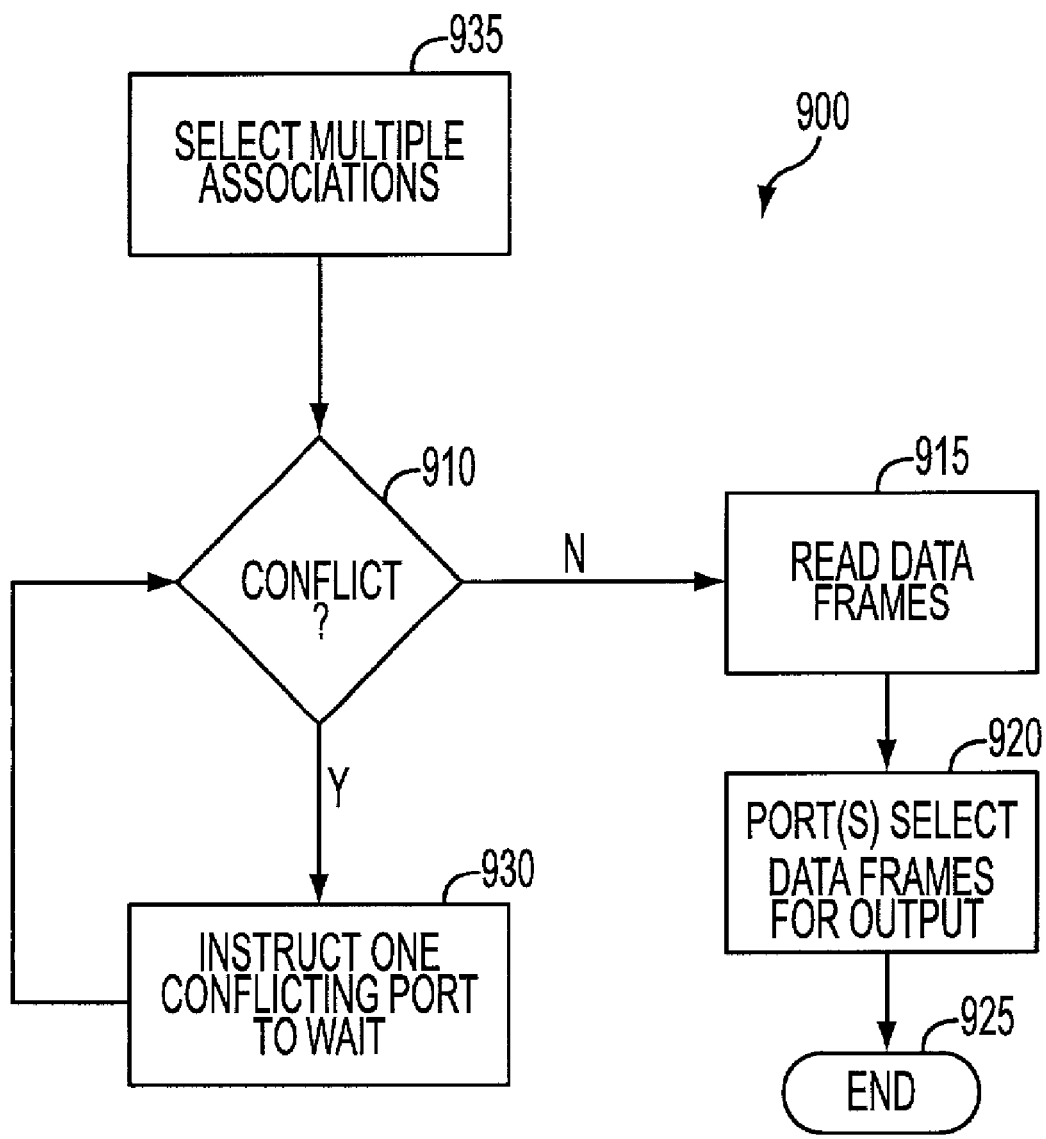
FIG. 9 is a flow chart of a process for reading stored copies of a received data frame for the switches shown in FIGS. 1 and 7.

FIG. 9 shows an exemplary process 900 for outputting data frames from a switch. The process begins when multiple associations are selected (step 905). In other words, every port of the switch is polled to determine if they have a data frame in frame memory that is ready to be transmitted. One exemplary method of performing this step is to store the associations in a queue and read them in a first-in-first-out (FIFO) order.

With multiple ports requesting data from the frame memory at the same time, it is possible that a conflict may arise such that two ports will require data from locations that share a data output bus in the frame memory. Accordingly, a determination is made to see if there is a conflict (step 910). If there is no conflict such that every port that has data frames to output may do so simultaneously, then the data frames are read from the frame memory in parallel (step 915). The ports select the data frames that are to be output, based on the association described above, and output the selected data frames (step 920). The process then ends (step 925).

If a conflict is determined (see step 910), then one of the ports that has a conflict is instructed to wait (step 930) and the remaining associations are checked again for a conflict (step 910). At worst case, ports will be instructed to wait until only one port remains and then the remaining port will be able to retrieve and output its data frames freely (see steps 915-925).

Figure 10A:
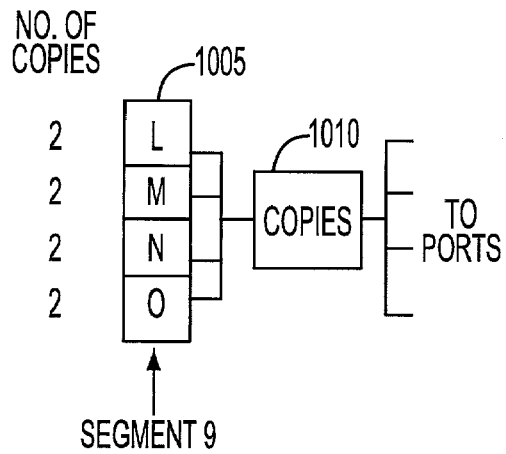
FIGS. 10a, 10b and 10c are representations of data stored in the switches of FIGS. 1 and 7.
Like reference symbols in the various drawings indicate like elements.

As shown in FIG. 10*a*, four data frames, each only a single channel wide, are stored in a segment 1005 of main memory in a conventional switch. The data frames are forwarded to copier 1010 where the necessary copies are made. In this example, two copies of each data frame are generated before the data frames are output to the ports. Since copier 1010 can only copy one data frame at a time, it follows that four read cycles are needed to output the four data frames L-O from Segment 9. It should be noted that if copier circuit 1010 were not present, the number of read cycles to output the four data frames shown increases to eight. It should also be noted that if multiple data frames are not packed into a single segment, the use of the memory would be less efficient.

Figure 10B:
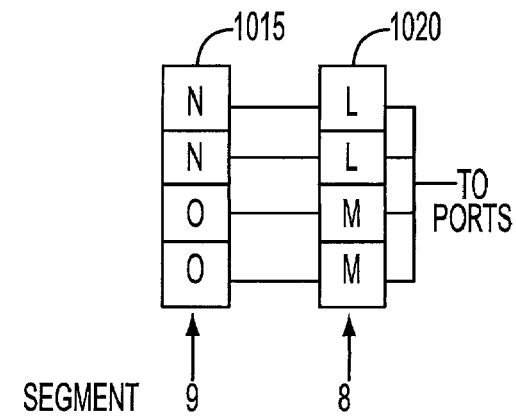

In contrast, FIG. 10b, shows two segments, 1015 and 1020, which have multiple copies of data frames already in them, in accordance with the implementations described above. Due to the packing of all of the needed copies of the data frames into a single segment, the implementations described above will output the required L and M data frames in one read cycle and the N and O frames in another cycle. Assuming that there are no port collisions such as the L data frame and the M data frame being transmitted over the same port, the implementations described can transmit the needed data frames in half the time of conventional switches (i.e., in two read cycles).

Figure 10C:
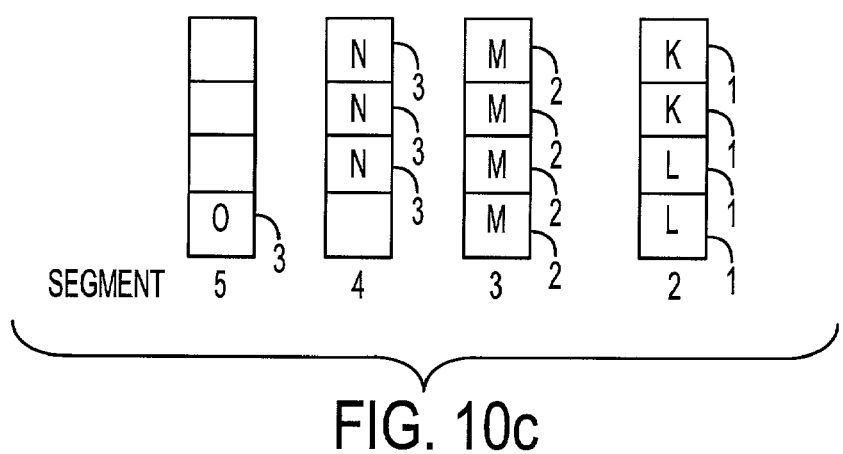

In one implementation, multiple segments of main memory 125 may be accessed simultaneously. This also provides increased efficiency. In FIG. 10c, the K and L data frames are read and transmitted first and the M data frames are read and transmitted second. Suppose that the arbitration circuit 620 or process places the N data frames and the O data frames in segments 4 and 5, respectively. If multiple segment access was not allowed, two read cycles would be needed to output the N data frames and the O data frame. However, in the implementation described above, multiple segment access is permitted and the N and O data frames can be read simultaneously if they do not have a port conflict.

Another advantage of the described implementations over conventional switches is the ability to determine where there is adequate memory space in a segment to accept the data frame. In some implementations, the described circuit and process are systematic like a queue. In other words, the data frames are stored in main memory 125 as they are received and little packing of different frames into a single segment is done (i.e., each received data frame and its corresponding copies are stored in a single segment). However, in other implementations, the circuitry looks for available space and only arbitrarily selects channel(s) or segment(s) when a conflict arises. Thus, the data frames are not stored in a strict queue-like structure in main memory 125. Instead, the described implementations can pack different data frames or multiple copies of a data frame (one per channel) into a single segment to allow for increased bandwidth when forwarding data frames over different ports in one read cycle.

It should be noted that other details are implicit in the above descriptions. For instance, multiple ports are receiving data frames and attempting to have them stored in memory. In the exemplary circuit described above, two or more ports 105a-105d may attempt to simultaneously place a data frame on receiving bus 115a. This internal data collision can be avoided by implementing well-known techniques.

In addition, most switches have error detection/correction. One example of an error is receiving only part of a data frame. Most switches, including those that implement circuits and techniques similar to those described above, will have error detection/correction techniques that will discard a received erroneous data frame and prevent it from being stored and/or transmitted in the network.

Similarly, common error correction methods in broadcast and multicast situations may also be employed. For example, broadcast storms, where data frames are replicated and sent back and forth between two switches until there is no room for new data frames, can be avoided by using protocol techniques that will cause the excess data frames to be considered as error data frames and not copied nor forwarded.

It should also be noted that the above discussion did not describe the use of a clock. Some implementations will include a clock to help manage data flow and avoid collisions. Some implementations will use clocks and registers to make the above calculations in pipeline format.

It will be understood that various modifications may be made. For example, main memory 125 need not be centralized in switch 100, but instead the main memory can be distributed across switch 100. In this alternative implementation, the copies of the received data frame are first routed to the distributed memory associated with the ports from which the copies are to be output. In yet other memory structures used in other implementations, input buffers and/or output buffers are added to ports 105a-105d to assist in the management of the data frames.

Other implementations include half-duplex buses 110a-110c instead of the full duplex buses described above. These implementations require collision avoidance, which can be obtained using the set of rules called carrier sense multiple access with collision detection (CSMA/CD).

Other implementations may include different numbers of ports, channels and segments in the memories. Nor do the number of channels in the memories need to equal the number of ports in the switch. Similarly, alternative implementations could require that each port be assigned to one channel in the memories.

In yet another implementation, copies of data frames that are more than half as wide as memory 125 are written into the segments in multiple write cycles instead of the single write cycle described above.

Other implementations may use fixed-length data frames. In such implementations, size determiner 605a is replaced with a constant value output that is the frame size of the implementation.

The above systems and methods may be implemented in any of a number of networking protocols. Some of these protocols may modify the header data, the payload data or both. Accordingly, other implementations are within the scope of the following claims.

What is claimed is:

1. A switching apparatus comprising:
a first port coupled to receive an input data frame;
a first logic circuit coupled to receive the input data frame from the first port and configured to determine a number of copies of the input data frame to make and to make the number of copies of the input data frame;
a first memory comprising multiple segments, each segment comprising multiple independently addressable channels, the first logic circuit configured to determine a number of channels and segments needed to store the number of copies of the input data frame, the first memory coupled to the first logic circuit and configured to store multiple copies of the input data frame within a single segment of the determined number of segments and to read the multiple copies of the input data frame from the single segment in a single read cycle; and
multiple transmitting ports coupled to the first memory and configured to receive copies of the input data frame from the first memory in parallel and to simultaneously transmit the copies of the input data frame, each of the multiple transmitting ports associated with an output control logic circuit coupled to the first memory and configured to determine when to read at least one copy of the input data frame from the first memory;
wherein the first logic circuit further comprises a third logic circuit configured to determine one or more empty locations in the first memory to store the copies of the input data frame.

2. The switching apparatus of claim 1 wherein the first logic circuit further comprises a second memory configured to keep track of all of the empty locations in the first memory.

3. The switching apparatus of claim 2 wherein: the third logic circuit is configured to determine where there are empty channels in the first memory to store the copies of the input data frame.

4. The switching apparatus of claim 2 wherein: the third logic circuit is configured to determine where there is at least one empty segment in the first memory to store one of the copies of the input data frame.

5. The switching apparatus of claim 1 wherein: the third logic circuit is configured to determine how many additional ports will output some of the copies of the input data frame and to calculate the minimum amount of storage space that is necessary to store all of the necessary copies of the input data frame in the first memory.

6. The switching apparatus of claim 1 wherein the first logic circuit further comprises a fourth logic circuit configured to determine the size of the input data frame such that the size of the input data frame is used to calculate the minimum amount of storage space necessary to store the copies of the input data frame.

7. The switching apparatus of claim 1 wherein the first memory is distributed across the switching apparatus.

8. The switching apparatus of claim 1 further comprising a bus coupled with the first memory and one or more transmitting ports and configured to transmit data including at least one copy of the input data frame from the first memory to the one or more transmitting ports.

9. The switching apparatus of claim 8 wherein one or more transmitting ports comprises a logic circuit configured to select the at least one copy of the input data frame from the bus.

10. The switching apparatus of claim 1 wherein at least one output control logic circuit is further configured to indicate a location in the first memory where an associated transmitting port is to obtain the at least one data frame for transmitting.

11. A switching apparatus comprising:
a first logic circuit coupled to receive an input data frame and configured to determine a number of copies of the input data frame to make and to make the determined number of copies of the input data frame;
a memory coupled to the first logic circuit and configured to store and read the copies of the input data frame, the memory being comprised of segments including independently addressable channels with one or more segments being accessible at a given time, the first logic circuit configured to determine a number of channels and segments needed to store the number of copies of the input data frame, the first memory to store multiple copies of the input data frame within a single segment of the determined number of segments and to read the multiple copies of the input data frame from the single segment in a single read cycle; and
multiple transmitting ports coupled to the first memory and configured to receive copies of the input data frame from the first memory in parallel and to simultaneously transmit the copies of the input data frame, each of the multiple transmitting ports associated with an output control logic circuit coupled to the memory and configured to determine when to read at least one copy of the input data frame from the memory;
wherein the first logic circuit further comprises a third logic circuit configured to determine one or more empty locations in the memory to store the copies of the input data frame.

12. The switching apparatus of claim 11 wherein the third logic circuit is configured to determine where there are empty channels in the memory for storing copies of the input data frame.

13. The switching apparatus of claim 11 wherein the third logic circuit is configured to determine where there is at least one empty segment in the memory for storing at least one copy of the input data frame.

14. The switching apparatus of claim 11 wherein the third logic circuit is configured to determine how many of the multiple transmitting ports will output some of the number of copies of the input data frame and to calculate the minimum amount of storage space necessary to store all of the necessary copies of the input data frame in the memory.

15. The switching apparatus of claim 11 wherein the first logic circuit further comprises a fourth logic circuit configured to determine the size of the input data frame in calculating the minimum amount of storage space to store the necessary copies of the input data frame in the memory.

16. A switching apparatus comprising:
a first port coupled to receive an input data frame;
a memory coupled to the first port and configured to store and read a number of copies of the input data frame, the memory comprising multiple segments, each segment comprising multiple independently addressable channels;
a processor coupled to the memory and programmed to determine the number of copies of the input data frame to make and to determine when to read at least one copy of the input data frame from the memory, the processor configured to determine a number of channels and segments needed to store the number of copies of the input data frame, the memory to store multiple copies of the input data frame within a single segment of the determined number of segments and to read the multiple copies of the input data frame from the single segment in a single read cycle; and
multiple transmitting ports coupled to the memory and configured to receive copies of the input data frame from the first memory in parallel and to simultaneously transmit the copies of the input data frame after being read from the memory;
wherein the processor is configured to determine one or more empty locations in the memory to store the copies of the input data frame.

17. The switching apparatus of claim 16 wherein the processor determines where there are empty channels in the memory to store the number of copies of the input data frame.

18. The switching apparatus of claim 16 wherein the processor determines where there is at least one empty segment in the memory to store the number of copies of the input data frame.

19. The switching apparatus of claim 16 wherein the processor determines how many transmitting ports will output any of the copies of the data frame and calculates a minimum amount of storage space necessary to store the copies of the input data frame.

20. The switching apparatus of claim 19 wherein the processor determines the size of the input data frame and uses this determination in calculating the minimum amount of storage space to store the number of copies of the input data frame.

21. A computer readable medium for use in a switching apparatus that includes a processor, the computer readable medium including instructions for causing the processor to:

determine a number of ports a received data frame is to be transmitted out over so as to generate a same number of copies of the received data frame;

determine particular locations in a memory that can store the copies of the received data frame;

determine a number of channels and segments needed to store the number of copies of the input data frame;

forward instructions and the copies of the received data frame to the memory so as to cause the memory to store multiple copies of the received data frame within a single segment of the determined number of segments;

forward instructions to the memory to read out the multiple copies of the received data frame from the single segment in parallel and output the copies onto a bus in a single clock cycle;

forward instructions to multiple transmitting ports causing the multiple transmitting ports to retrieve and simultaneously transmit the copies of the received data frame from the bus; and determine one or more empty locations in the memory to store the copies of the input data frame.

22. The computer readable medium of claim 21 wherein the processor is instructed to determine the location or locations, addressable by channels and segments, that can store the copies of the received data frame.

23. The computer readable medium of claim 22 further comprising an instruction for the memory to store some copies of the received data frame in multiple segments of the memory.

24. The computer readable medium of claim 22 wherein when the memory reads out at least one copy of the number of copies of the received data frame, the memory also reads out a previously stored copy from a previously received data frame.

25. The computer readable medium of claim 21 wherein the instructions cause the processor to determine the size of the received data frame and use a result from this determination when the processor is determining particular locations in the memory to store the copies of the received data frame.

* * * * *